United States Patent
Wang et al.

(10) Patent No.: US 9,075,461 B2
(45) Date of Patent: Jul. 7, 2015

(54) PROCESSING METHOD FOR TOUCH SIGNAL AND COMPUTING DEVICE THEREOF

(71) Applicants: Wistron Corporation, New Taipei (TW); ETURBOTOUCH TECHNOLOGY INC., Taoyuan County (TW)

(72) Inventors: Kuei-Ching Wang, Longtan Township, Taoyuan County (TW); Ta-Hu Lin, Taipei (TW)

(73) Assignees: Wistron Corporation, Hsichih, New Taipei (TW); eTurboTouch Technology Inc., Zhongli Dist., Taoyuan (TW)

( * ) Notice: Subject to any disclaimer, the term of this patent is extended or adjusted under 35 U.S.C. 154(b) by 113 days.

(21) Appl. No.: 13/681,805

(22) Filed: Nov. 20, 2012

(65) Prior Publication Data

US 2013/0135232 A1 May 30, 2013

(30) Foreign Application Priority Data

Nov. 25, 2011 (TW) .............................. 100143441 A

(51) Int. Cl.
*G06F 3/041* (2006.01)
*G06F 3/0488* (2013.01)

(52) U.S. Cl.
CPC ............ *G06F 3/041* (2013.01); *G06F 3/04883* (2013.01); *G06F 3/0416* (2013.01); *G06F 3/0488* (2013.01)

(58) Field of Classification Search
CPC ......... G06F 3/041; G06F 3/045; G06F 3/048; G06F 3/0484; G06F 3/0488; G06F 3/04883; G06F 2203/04104; G06F 2203/04106

USPC .................................................. 345/173–176
See application file for complete search history.

(56) References Cited

U.S. PATENT DOCUMENTS

| | | | |
|---|---|---|---|
| 2006/0168548 A1* | 7/2006 | Kelley et al. .................. | 715/857 |
| 2006/0267957 A1* | 11/2006 | Kolmykov-Zotov et al. . | 345/173 |
| 2010/0073301 A1* | 3/2010 | Yousefpor et al. ............ | 345/173 |
| 2010/0264938 A1* | 10/2010 | Yeh et al. ...................... | 324/649 |
| 2011/0012855 A1* | 1/2011 | Yeh et al. ...................... | 345/173 |
| 2012/0158629 A1* | 6/2012 | Hinckley et al. ................ | 706/15 |
| 2013/0241847 A1 | 9/2013 | Shaffer | |

FOREIGN PATENT DOCUMENTS

| | | |
|---|---|---|
| JP | H07306752 A | 11/1995 |
| JP | 2001228971 A | 8/2001 |
| JP | 2011501261 A | 1/2011 |
| KR | 1020100088717 A | 8/2010 |

OTHER PUBLICATIONS

Office action mailed on May 31, 2014 for the Korea application No. 10-2012-0132686.

* cited by examiner

*Primary Examiner* — Dwayne Bost
*Assistant Examiner* — Stefan M Oehrlein
(74) *Attorney, Agent, or Firm* — Winston Hsu; Scott Margo

(57) ABSTRACT

A processing method for touch signal includes the steps of loading a palm rejection program staying resident on a computing device, and receiving a touch input signal from a touch device by the computing device. The palm rejection program performs a palm rejection process to the touch input signal in real time or instructs the touch device to output the touch input signal after performing the palm rejection process.

14 Claims, 5 Drawing Sheets

PROCESSING METHOD FOR TOUCH SIGNAL AND COMPUTING DEVICE THEREOF

CROSS REFERENCE TO RELATED APPLICATIONS

This Non-provisional application claims priority under 35 U.S.C. §119(a) on Patent Application No(s). 100143441 filed in Taiwan, Republic of China on Nov. 25, 2011, the entire contents of which are hereby incorporated by reference.

BACKGROUND OF THE INVENTION

1. Field of Invention

The present invention relates to a signal processing method and a computing device, and in particular, to a processing method of a touch signal and a computing device thereof.

2. Related Art

Various kinds of touch input devices have been widely applied to electronic products such as mobile phones and tablets, which are configured with a touch panel serving as the input device. The user can easily operate the input panel by finger to input instructions, control the cursor, or input text by writing.

In general, the touch panels include resistive, capacitive, supersonic, or infrared types. Herein, the resistive touch panel is most popular. The designs of the resistive touch panels include 4-wire, 5-wire, 6-wire and 8-wire resistive touch panels. With considering of the cost and development, the 4-wire resistive touch panel has been applied to many productions and applications.

Besides, when using a middle or large scaled touch screen to writing, the user easily puts his/her palm on the screen, which can cause an undesired palm input event. Unfortunately, the touch screen may treat the undesired palm input event as a touch input operation and thus generate a fault input signal. In order to prevent the fault input signal caused by the undesired palm input event, the conventional art tries to change the structure and design of the touch panel to solve this problem.

Regarding to a resistive touch panel, for example, when the finger presses the touch panel, the thin-film conductive layer disposed between the spacers is deformed so that the thin-film conductive layer is conducted with another conductive layer. The touch panel can present the undesired touch event of palm by configuring the spacers of different distribution densities. For example, if the density of the spacers is increased, the user needs to apply larger pressing force on the touch panel to conduct two conductive layers so as to generate an effective touch input. However, in general, the pressing force caused by finger is smaller, but the pressing force caused by palm or stylus is larger. If the arrangement of the spacers is designed to achieve the palm rejection function, the user must apply larger force to generate effective touch input. Although this method is able to solve the undesired palm touch event, the applied force in finger touch operation must be increased, which may cause inconvenience to the user.

Therefore, it is an important subject of the invention to provide a processing method of a touch signal and a computing device thereof that can exclude the unintentional touch of palm.

SUMMARY OF THE INVENTION

In view of the foregoing subject, an objective of the present invention is to provide a processing method of a touch signal and a computing device thereof that can exclude the unintentional touch of palm.

To achieve the above objective, the present invention discloses a processing method for a touch signal, comprising the steps of: loading a palm rejection program staying resident on a computing device; and receiving a touch input signal from a touch device by the computing device. Herein, the palm rejection program performs a palm rejection process to the touch input signal in real time or instructs the touch device to output the touch input signal after performing the palm rejection process.

To achieve the above objective, the present invention discloses a computing device, comprising a memory unit, an input interface and a process unit. The memory unit is configured for loading a palm rejection program, which is a resident program. The input interface is coupled with a touch device for receiving a touch input signal. The process unit is coupled with the memory unit and the input interface for executing the palm rejection program so as to perform a palm rejection process to the touch input signal in real time or to instruct the touch device to output the touch input signal after performing the palm rejection process.

In one embodiment, the touch device is an active matrix resistive touch device or a capacitive touch device.

In one embodiment, after performing the palm rejection process, the processed touch input signal is provided as an effective input signal for an operation system of the computing device.

In one embodiment, an icon of the palm rejection program is displayed in a tool bar on a screen of the computing device.

In one embodiment, a palm rejection item is selectively enabled according to a user instruction. When the palm rejection item is enabled, the palm rejection program performs the palm rejection process to the touch input signal in real time. Otherwise, when the palm rejection item is disabled, the palm rejection program does not perform the palm rejection process to the touch input signal.

In one embodiment, when the palm rejection item is disabled, the touch input signal is directly provided as an effective input signal for an operation system of the computing device.

In one embodiment, the palm rejection process comprises determining whether a large area touch event of the touch device is occurred according to the touch input signal, and eliminating the information of the touch input signal corresponding to the large area touch event in real time.

As mentioned above, in the processing method of a touch signal and the computing device thereof, the palm rejection program can perform a palm rejection process to the touch input signal in real time, thereby efficiently eliminating the undesired touch event of palm. Accordingly, the user can operate the touch device as usual, and does not need to apply a larger pressing force on the touch device. Regarding to the active matrix resistive touch device with multi-touch input ability, if it simultaneously pressed by the finger and palm, the computing device can eliminate part of the signal information caused by the palm touch event. The touch device dose not need the high density design for providing the palm rejection function, so that the manufacturing cost of the touch device can be reduced. Besides, since the computing device has the function of palm rejection, the cooperated touch device can be more suitable for the writing input. Moreover, the large scaled touch device can be used for providing multiple users simultaneously.

Regarding a capacitive touch device, it is unnecessary to install software or firmware with the palm rejection function in the touch device, and/or to intentionally modify the layout. By staying resident the palm rejection program on the computing device, the desired palm rejection function can be provided. This can decrease the manufacturing cost and structural complexity of the touch device as well as the thickness of the product.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
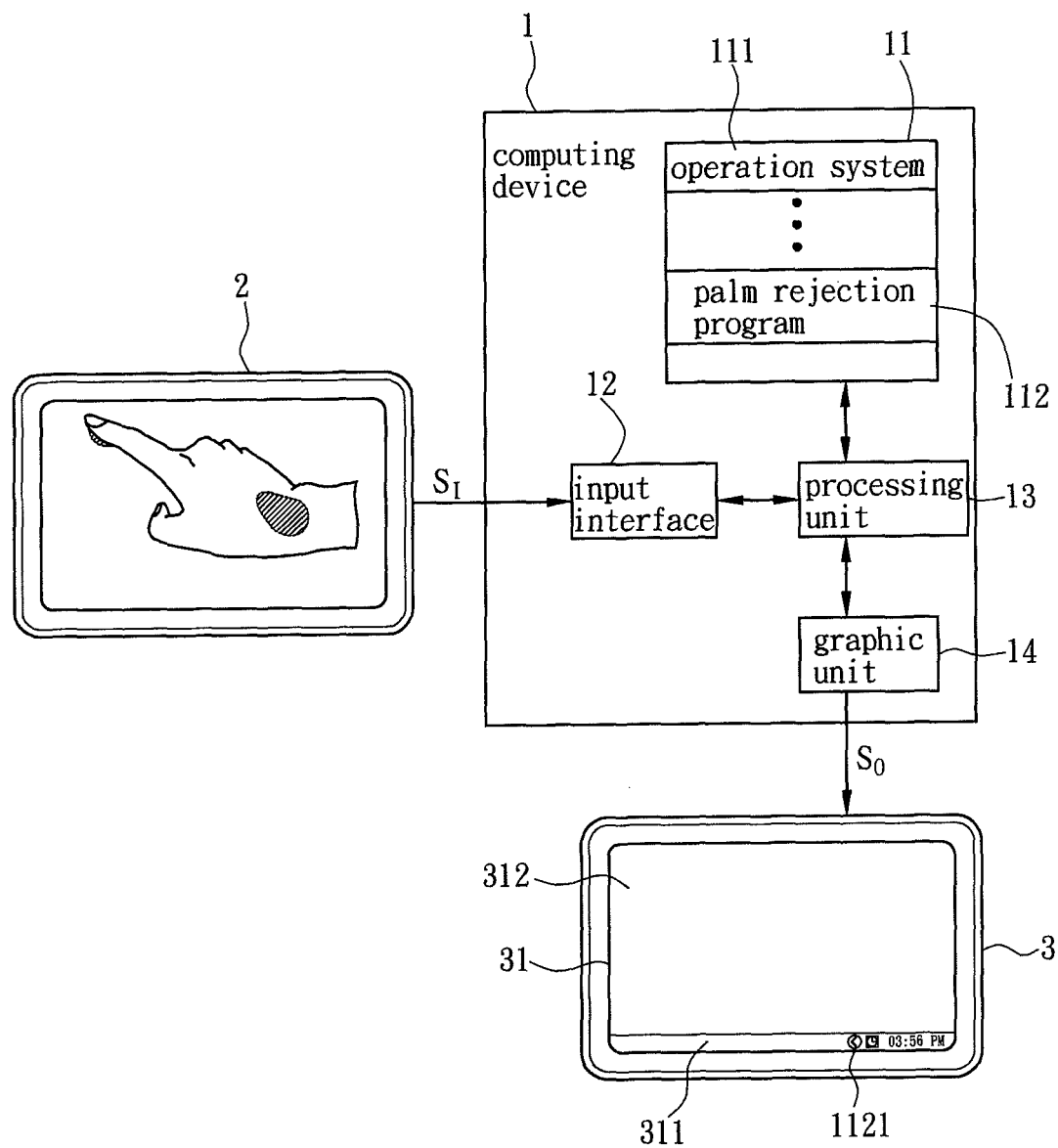
FIG. 1 is a block diagram showing a computing device and a touch device according to an embodiment of the present invention.

FIG. 1 is a block diagram showing a computing device 1 and a touch device 2 according to an embodiment of the present invention. Referring to FIG. 1, the computing device 1 includes a memory unit 11, an input interface 12, a process unit 13 and a graphic unit 14. The processing unit 13 is coupled with the memory unit 11, the input interface 12 and the graphic unit 14.

The processing unit 13 has one or more processors for executing instructions so as to perform desired calculations (e.g. mathematic or logic calculations). Otherwise, the processor(s) of the processing unit 13 may execute instructions to transmitting data to the memory unit 11, the input interface 12 or the graphic unit 14. The memory unit 11 has at least one volatile memory or at least one non-volatile memory, which stores or loads the program with instruction for the processing unit 13 to execute, or stores or loads data that the processing unit 13 can execute instruction to process. The input interface 12 has at least one I/O port, which can be a wired or wireless I/O port (e.g. USB, IEEE 1394, or Bluetooth™ port). The processing unit 13 may further include at least one system chipset for handling the data transmission between the memory unit 11, the input interface 12, the graphic unit 14 and the processor(s).

The memory unit 11 loads an operation system 111 and a palm rejection program 112. The palm rejection program 112 is a resident program in the computing device 1. For example, after the computing device 1 is booted and the operation system 111 is loaded to the memory unit 11, the palm rejection program 112 is also loaded to the memory unit 11 and auto run.

The input interface 12 is coupled with a touch device 2 for receiving a touch input signal $S_I$, which is provided for the operation system 111 or the palm rejection program 112 to process. For example, the palm rejection program 112 can intercept the touch input signal $S_I$. In more details, after the touch input signal $S_I$ is transmitted from the touch device 2 to the input interface 12 and before the operation system 111 is triggered to process it, the palm rejection program 112 is triggered to process the touch input signal $S_I$. Alternatively, after the touch input signal $S_I$ is transmitted from the touch device 2 to the input interface 12, the operation system 111 may request the palm rejection program 112 to process the touch input signal $S_I$ in advance, and then to feedback the palm rejection program 112 is triggered to process the touch input signal $S_I$ to the operation system 111.

The process unit 13 can execute the palm rejection program 112 to perform a palm rejection process to the touch input signal $S_I$ in real time. Herein, the function of the palm rejection process is to remove some information of the touch input signal $S_I$ that is caused by palm or large area touch. In other words, the palm rejection process can remain the part of the touch input signal $S_I$ that is caused by finger(s) or small area touch. For example, the palm rejection process may include the steps of determining whether a large area touch event of the touch device 2 is occurred according to the touch input signal $S_I$, and eliminating part information of the touch input signal $S_I$ corresponding to the large area touch event in real time.

Moreover, the graphic unit 14 outputs a graphic signal $S_O$ to a displayer 3 for displaying a screen 31, which is a user interface of the operation system 111. For example, the operation system 111 is a windows operation system, and the user interface (the screen 31) is a graphic user interface. The screen 31 has a tool bar 311 and a desktop 312, and an icon 1121 of the palm rejection program 112 can be displayed in the tool bar 311 through the graphic unit 14.

The processing method for a touch signal will be described in more detailed with reference to the following flow charts.

Figure 2:
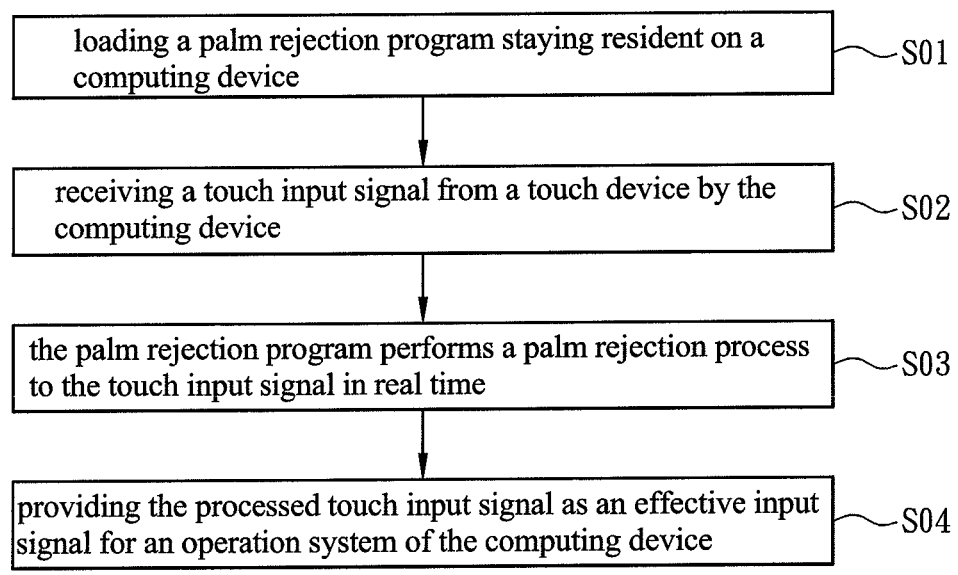
FIG. 2 and FIG. 3 are flow charts of processing methods for touch signal according to the embodiment of the present invention.

FIG. 2 is a flow chart of a processing method for a touch signal according to the embodiment of the present invention. Referring to FIG. 2, the processing method for a touch signal includes the following steps of:

Step S01: loading a palm rejection program staying resident on a computing device;

Step S02: receiving a touch input signal from a touch device by the computing device;

Step S03: the palm rejection program performs a palm rejection process to the touch input signal in real time; and Step S04: providing the processed touch input signal as an effective input signal for an operation system of the computing device.

In this embodiment, the processing method for a touch signal can be applied to the computing device of FIG. 1. After booting, the computing device loads the operation system and the palm rejection program, and the palm rejection program stays resident on the computing device for processing the received touch input signal from the touch device.

The operation system can obtain the effective input signal(s) from multiple input devices. The effective input signals are provided as instructions or data, and the operation system can process the effective input signals such as executing or transmitting instructions, or storing or transmitting data. The processed touch input signals is used as effective input signals. According to this process, the interference or noise caused by palm or large area touch can be eliminated so as to prevent the operation system to treat the information caused by the palm or large area touch as effective input.

In this embodiment, the touch input signal originally includes the entire or most touch information. That is, the information caused by all touch events (large or small area touch events) is contained in the original touch input signal, which is transmitted from the touch device to the computing device. In other words, the touch device does not need the function or mechanism of preventing or eliminating the unintentional touch of palm as long as the computing device is running the palm rejection program for eliminating the unintentional touch of palm.

Figure 3:
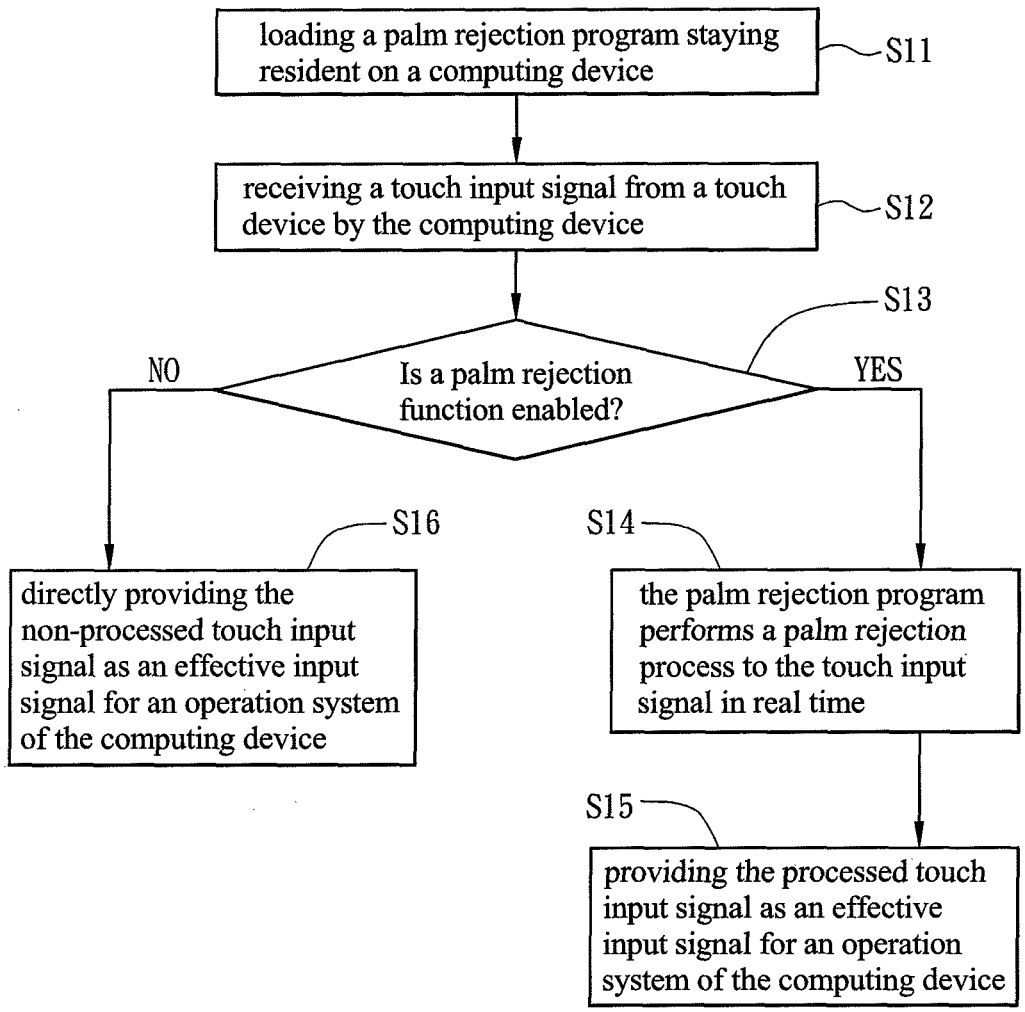

In addition, the resident palm rejection program can be selectively enabled. FIG. 3 is a flow chart of a processing method for a touch signal according to the embodiment of the present invention. Referring to FIG. 3, the processing method for a touch signal includes the following steps of:

Step S11: loading a palm rejection program staying resident on a computing device;

Step S12: receiving a touch input signal from a touch device by the computing device;

Step S13: determining whether a palm rejection function is enabled;

Step S14: the palm rejection program performs a palm rejection process to the touch input signal in real time;

Step S15: providing the processed touch input signal as an effective input signal for an operation system of the computing device; and Step S16: directly providing the non-processed touch input signal as an effective input signal for an operation system of the computing device.

The steps S11 and S12 are the same as the steps S01 and S02 of FIG. 2. In addition, if the step S13 determines that the palm rejection function has been enabled, the processing method goes to the steps S14 and S15. Otherwise, if the step S13 determines that the palm rejection function has not been enabled, the processing method goes to the step S16.

The palm rejection function can be selectively enabled or disabled according to a user instruction. For example, as shown in FIG. 1, the user clicks the icon to enable or disable the palm rejection function. In addition, although the palm rejection function is disabled, the palm rejection program still stays resident on the computing device.

The steps S14 and S15 are the same as the steps S03 and S04 of FIG. 2. In steps S14 and S15, when the palm rejection function is enabled, the palm rejection program performs a palm rejection process to the touch input signal in real time, and then the processed touch input signal is provided as an effective input signal for the operation system.

In step S16, when the palm rejection function is disabled, the palm rejection program does not perform the palm rejection process to the touch input signal, so that the non-processed touch input signal is directly provided as an effective input signal for the operation system.

In another embodiment, the step S12 is to use the computing device to receive a touch input signal and a device identification signal from a touch device, and then determine whether the touch device is an active matrix resistive touch device or a capacitive touch device, which needs the palm rejection function, before the step S13. If yes, the step S13 is sequentially performed; otherwise, if not, the step S13 as well as the following steps are not performed.

Figure 4:
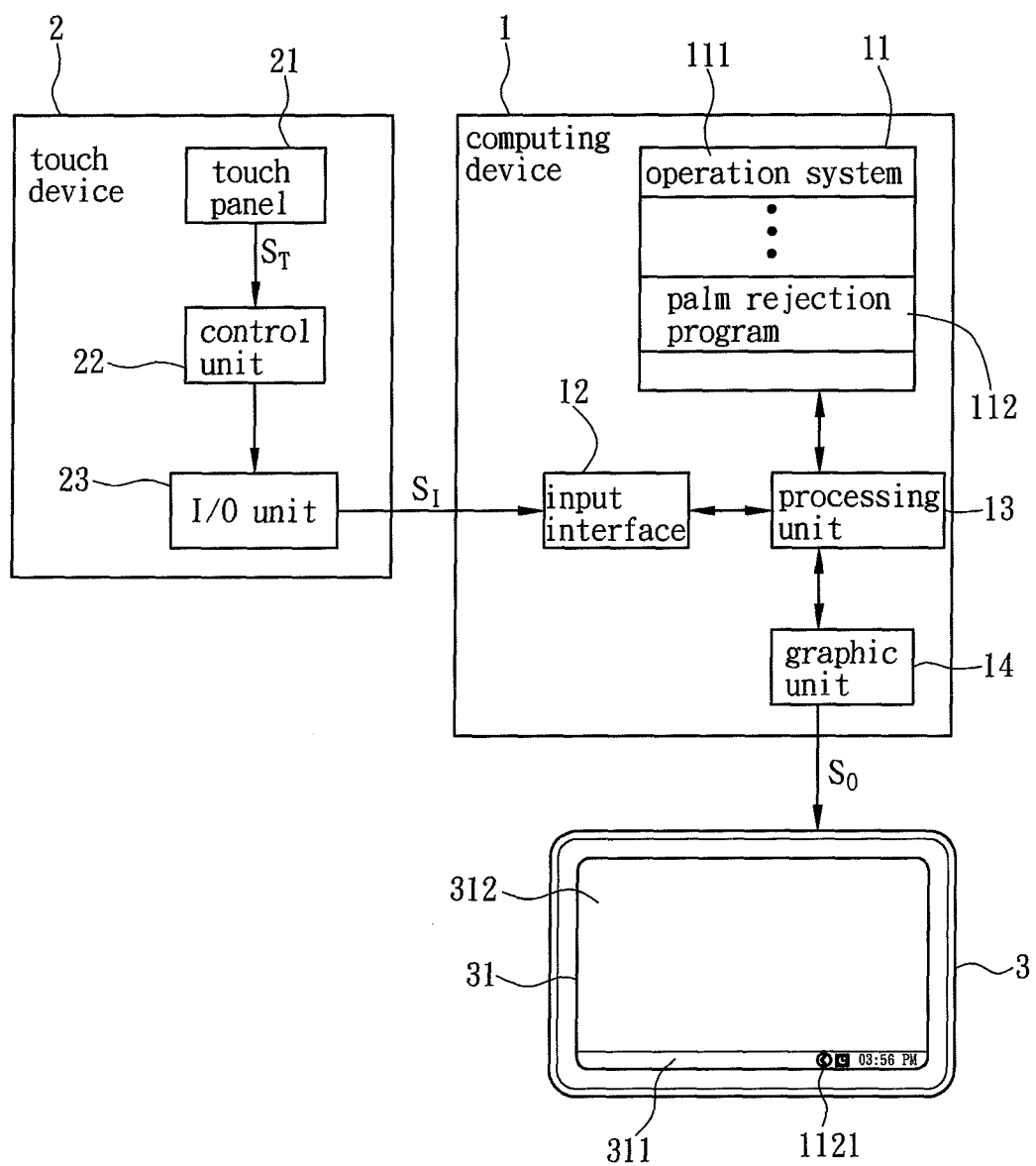
FIG. 4 is a block diagram showing a computing device and a touch device according to an embodiment of the present invention.

In addition, the touch device may further have the palm rejection function. As shown in FIG. 4, the touch device 2 includes a touch panel 21, a control unit 22 and an I/O unit 23. The touch panel 21 can generate a touch signal $S_T$ according to external touch event. The control unit 22 is coupled to the touch panel 21 for processing the touch signal $S_T$ so as to generate a touch input signal $S_I$ containing the corresponding coordinates. That is, the touch input signal $S_I$ is generated based on the touch signal $S_T$. The I/O unit 23 is coupled to the control unit 22 for outputting the touch input signal $S_I$.

The control unit 22 can perform a palm rejection process in real time to remove some information of the touch signal $S_T$ that is caused by palm or large area touch. In other words, the palm rejection process can remain the part of the touch signal $S_T$ that is caused by finger(s) or small area touch. For example, the palm rejection process may include the steps of: determining whether a large area touch event of the touch device 2 is occurred according to the touch signal $S_T$, and eliminating part information of the touch signal $S_T$ corresponding to the large area touch event in real time. The touch input signal $S_I$ is generated according to the processed touch signal $S_T$. Besides, the control unit 22 may not perform the palm rejection process.

The I/O unit 23 is coupled to the input interface 12 for transmitting the touch input signal $S_I$. After the input interface 12 receives the touch input signal $S_I$ from the touch device 2, the received touch input signal $S_I$ is provided for the operation system 111 or the palm rejection program 112 to process. The operation system 111 can treat the touch input signal $S_I$ as an effective signal. Alternatively, the palm rejection program 112 may perform another palm rejection process to the touch input signal $S_I$ so as to totally achieve the desired palm rejection function.

Figure 5:
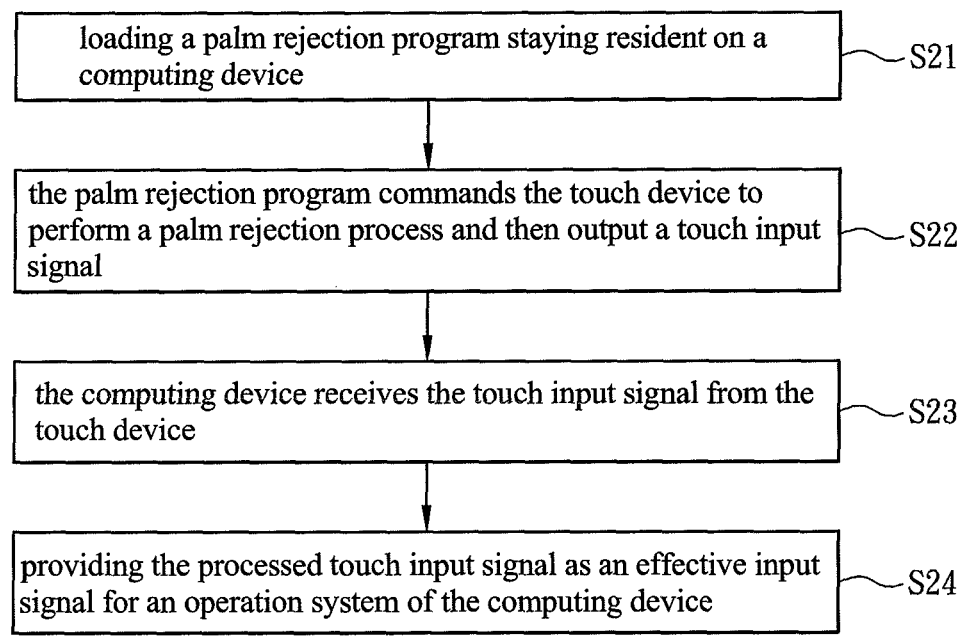
FIG. 5 is a flow chart of a processing method for touch signal according to the embodiment of the present invention.

Besides, the palm rejection program may command the touch device to perform the palm rejection process and then output the touch input signal. FIG. 5 is a flow chart of a processing method for a touch signal according to the embodiment of the present invention. Referring to FIG. 5, the processing method for a touch signal includes the following steps of:

Step S21: loading a palm rejection program staying resident on a computing device;

Step S22: the palm rejection program commands the touch device to perform a palm rejection process and then output a touch input signal;

Step S23: the computing device receives the touch input signal from the touch device; and Step S24: providing the processed touch input signal as an effective input signal for an operation system of the computing device.

In this embodiment, the processing method of a touch signal can be applied to the computing device of FIG. 1. The booted computing device loads the operation system and the palm rejection program, and the palm rejection program stays resident on the computing device for processing the received touch input signal from the touch device.

After the step S22, the touch device performs a palm rejection process to the touch input signal. Accordingly, the touch input signal may not include entire or all of the touch information generated by the touch panel, and the interference of palm or large area touch input in the original touch information is removed. Thus, the touch input signal transmitted to the computing device in the step S23 should include only the touch information of small area touch or not the interference of palm. Consequently, the step S24 can simply take the received touch input signal as an effective input signal.

In addition, the palm rejection program of this embodiment can be selectively enabled. The processing flow and the relative modifications are similar to those described in FIG. 3, so the detailed description thereof will be omitted.

Moreover, the palm rejection program may have both functions of directly performing the palm rejection process and commanding the touch device to perform the palm rejection process. For example, the palm rejection program commands the touch device to perform a palm rejection process and then output a touch input signal, and also performs a palm rejection process to the touch input signal from the touch device in real time.

In the above embodiments, the palm rejection program can be stored in an optical disk, which is packaged with the touch device for sale or shipping. The user can use the optical disk to store or install the palm rejection program in a computing device. Besides, the palm rejection program may be stored in other portable nonvolatile memory device such as a flash or memory card. Alternatively, the palm rejection program may be stored in an Internet server, so that the user can download the palm rejection program from the internet server and then store or install it in the computing device. After executing the stored or installed palm rejection program, the palm rejection program can stay resident on the computing device for providing the function of palm rejection.

In the above embodiments, the touch device can be an active matrix resistive touch device or a capacitive touch device, which has the multi-touch function. Besides, since the computing device has been installed with the palm rejection program, the touch device is not necessary to be configured with the high density design for providing the palm rejection ability. Nevertheless, the touch device may be individually designed with the palm rejection ability, installed with palm rejection software, or modified in the layout thereof.

To sum up, in the processing method of a touch signal and the computing device thereof, the palm rejection program can perform a palm rejection process to the touch input signal in real time, thereby efficiently eliminating the undesired touch event of palm. Accordingly, the user can operate the touch device as usual, and does not need apply a larger pressing force on the touch device. Regarding to the active matrix resistive touch device with multi-touch input ability, if it simultaneously pressed by the finger and palm, the computing device can eliminate part of the signal information caused by the palm touch event. The touch device does not need the high density design for providing the palm rejection function, so that the manufacturing cost of the touch device can be reduced. Besides, since the computing device has the function of palm rejection, the cooperated touch device can be more suitable for the writing input. Moreover, the large scaled touch device can be used for providing multiple users simultaneously.

Regarding to a capacitive touch device, it is unnecessary to install software or firmware with the palm rejection function in the touch device, and/or to intentionally modify the layout. By staying resident the palm rejection program on the computing device, the desired palm rejection function can be provided. This can decrease the manufacturing cost and structural complexity of the touch device as well as the thickness of the product.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A processing method for a touch signal, comprising the steps of:
    loading a palm rejection program staying resident on a computing device;
    receiving a touch input signal from a touch panel of a touch device by a controller of the touch device;
    performing a palm rejection process by the controller to the touch input signal to generate a pre-processed touch input signal, the palm rejection process eliminating parts of the touch input signal caused by a palm in real time and retaining parts of the touch input signal caused by a plurality of fingers in real time;
    receiving the pre-processed touch input signal from the touch device by the computing device;
    performing another palm rejection process by the palm rejection program to the pre-processed touch input signal to generate a processed touch input signal, the another palm rejection process making sure parts of the touch input signal caused by the palm are totally removed; and
    instructing the touch device to output the processed touch input signal after performing the another palm rejection process.

2. The process method of claim 1, wherein the touch device is an active matrix resistive touch device or a capacitive touch device.

3. The process method of claim 1, further comprising:
    providing the processed touch input signal, as an effective input signal for an operation system of the computing device.

4. The process method of claim 1, further comprising:
    displaying an icon of the palm rejection program in a tool bar on a screen of the computing device.

5. The process method of claim 1, further comprising:
    selectively enabling a palm rejection item according to a user instruction;
    when the palm rejection item is enabled, the palm rejection program performs the another palm rejection process to the pre-processed touch input signal in real time; and
    when the palm rejection item is disabled, the palm rejection program does not perform the another palm rejection process to the pre-processed touch input signal.

6. The process method of claim 5, further comprising:
    when the palm rejection item is disabled, directly providing the pre-processed touch input signal as an effective input signal for an effective input signal for an operation system of the computing device.

7. The process method of claim 1, wherein the palm rejection process comprises:
    determining whether a large area touch event of the touch device is occurred according to the touch input signal; and
    eliminating the information of the touch input signal corresponding to the large area touch event in real time.

8. A computing device, comprising:
    a memory unit for loading a palm rejection program, wherein the palm rejection program is a resident program;
    a controller of a touch device for receiving a touch input signal and for performing a palm rejection process to the touch input signal to generate a preprocessed touch input signal;
    an input interface coupled with the touch device for receiving the pre-processed touch input signal; and
    a process unit coupled with the memory unit and the input interface for executing the palm rejection program so as to perform another palm rejection process to the pre-processed touch input signal to generate a processed touch input signal or for instructing the touch device to output the pre-processed touch input signal after performing the palm rejection process;
    wherein the palm rejection process eliminates parts of the touch input signal caused by a palm in real time and retains parts of the touch input signal caused by a plurality of fingers in real time.

9. The computing device of claim 8, wherein the touch device is an active matrix resistive touch device or a capacitive touch device.

10. The computing device of claim 8, wherein the memory unit loads an operation system for instructing the process unit to operate, and the processed touch input signal is provided as an effective input signal for the operation system.

11. The computing device of claim 8, further comprising:
a graphic unit coupled with the process unit for displaying an icon of the palm rejection program in a tool bar on a screen.

12. The computing device of claim 8, wherein:
the process unit selectively enables a palm rejection item according to a user instruction;
when the palm rejection item is enabled, the palm rejection program performs the another palm rejection process to the pre-processed touch input signal in real time; and
when the palm rejection item is disabled, the palm rejection program does not perform the another palm rejection process to the pre-processed touch input signal.

13. The computing device of claim 12, wherein the memory unit loads an operation system for instructing the process unit to operate so as to directly providing the pre-processed touch input signal as an effective input signal for the operation system when the palm rejection item is disabled.

14. The computing device of claim 12, wherein the palm rejection process comprises:
determining whether a large area touch event of the touch device is occurred according to the touch input signal; and
eliminating the information of the touch input signal corresponding to the large area touch event in real time.

* * * * *